(12) United States Patent
Lee (10) Patent No.: US 7,284,865 B1
(45) Date of Patent: Oct. 23, 2007

(54) SCROLLING DEVICE WITH COLOR SEPARATION AND PROJECTION SYSTEM INCORPORATING SAME

(76) Inventor: Tung-Chi Lee, No. 158, Sanmin Rd., Fongyuan City, Taichung County 420 (TW)

( * ) Notice: Subject to any disclaimer, the term of this patent is extended or adjusted under 35 U.S.C. 154(b) by 0 days.

(21) Appl. No.: 11/466,361

(22) Filed: Aug. 22, 2006

(51) Int. Cl.
  *G03B 21/00* (2006.01)
  *G03B 21/28* (2006.01)
  *G02B 27/12* (2006.01)
  *H04N 9/12* (2006.01)

(52) U.S. Cl. .......................... 353/31; 353/81; 353/99; 359/639; 348/742

(58) Field of Classification Search .................. 353/31, 353/33, 81, 94, 98, 99; 359/617, 639; 362/19, 362/346; 348/42, 51, 742, 743, 756, 782, 348/E13.023, E13.05, E13.056, E13.058, 348/E13.059
See application file for complete search history.

(56) References Cited

U.S. PATENT DOCUMENTS

| | | | | |
|---|---|---|---|---|
| 3,841,730 | A | * | 10/1974 | Karelitz ...................... 359/617 |
| 4,922,336 | A | * | 5/1990 | Morton ........................ 348/51 |
| 5,604,525 | A | * | 2/1997 | Kieselbach ................. 347/169 |
| 7,006,163 | B2 | * | 2/2006 | Yamamoto et al. ......... 348/742 |

* cited by examiner

*Primary Examiner*—Melissa Jan Koval
(74) *Attorney, Agent, or Firm*—Law Offices of Lai & Assoc. PC; Theodore Lapus; Edwin Greiner (57) ABSTRACT

A scrolling device with color separation and a projection system incorporating same are disclosed. The scrolling device comprises a scrolling shaft and a plurality of dichroic mirrors that are spirally arranged as screw threads on the scrolling shaft. The scrolling device rotates around predetermined axis, and the dichroic-mirror threads can separate an incident light beams into two or more color light beams, thereby scrolling the positions of these color beams. The scrolling color beams are then transmitted to a light modulating panel in the projection system. Therefore, a single-panel projection system with color scrolling function is achieved.

20 Claims, 12 Drawing Sheets

SCROLLING DEVICE WITH COLOR SEPARATION AND PROJECTION SYSTEM INCORPORATING SAME

FIELD OF THE INVENTION

The present invention generally relates to a scrolling device with color separation and a projection system incorporating same, and more specifically relates to the scrolling device for use in a single-panel projection system to separate an incident light into a plurality of color light beams.

BACKGROUND OF THE INVENTION

Some projection systems include light valves to modulate an incident light beam with an image signal. The light valve is also referred as an image panel. The image panel can be transmissive or reflective. The number of image panels in a projection system might be either one or three. In a three-panel projection system, a white light beam which is emitted from a white-light source is separated into red, green, and blue (RGB) color beams. The three color beams are modulated by an individual panel, and then are combined to form an image. The advantage of three-panel projection system has high optical efficiency. The weakness is higher cost and complexity, and also requires precise alignment among the three image panels. In a single-panel system, a color wheel is for filtering the white light into one of the R, G, and B color beams sequentially. Only one color beam can be transmitted onto the image panel at any one time, and the light of other two colors are discarded. The advantage of single-panel is compact and lower cost and the optical efficiency only achieves ⅓ of a three-panel system.

A color scrolling technique is then developed to increase the optical efficiency of the single-panel projection system. The white light beam is separated into R, G, and B color beams, and the three color beams are simultaneously transmitted onto different portions of the image panel. The three color beams are scrolled across the image panel, and every pixel of image panel can be illuminated by the three color beams sequentially.

Figure 1:
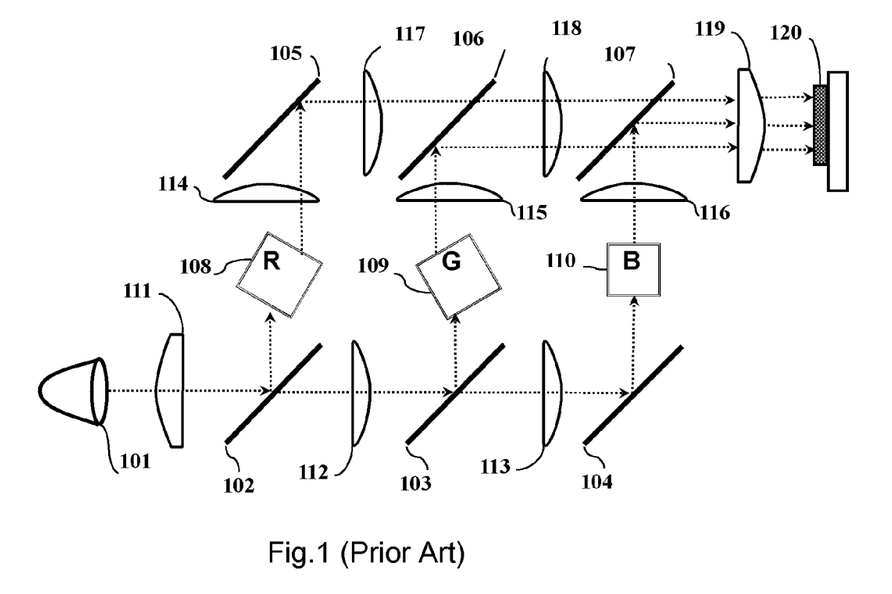
FIG. 1 is a schematic view of a conventional single-panel scrolling projection system.

A single-panel scrolling projection system is shown in FIG. 1. A white light emitted from a light source 101 passes through a condenser lens 111, and is separated into R, G, and B color beams through dichroic mirrors 102, 103, and a mirror 104. The red beam R is reflected by the dichroic mirror 102, and is then propagated through a rotating prism 108. The green beam G passes through the dichroic mirror 102 and a field lens 112, and is reflected by the dichroic mirror 103, and is then propagated through a rotating prism 109. The blue beam B passes through the dichroic mirror 102, 103 and the field lens 112, 113, and is reflected by the mirror 104, and is then propagated through a rotating prism 110. The rotating prisms 108, 109 and 110 will cause the positions of three color beams to be scrolled by refraction. The scrolling color beams are then combined through the dichroic mirrors 105, 106, and a mirror 107. The field lenses 114, 115, 116, 117, 118 are used to define the shape of the scrolling color beams. The combined beams impinge onto the surface of an image panel 120 via the relay lens 119, and are then modulated by the image panel 120. The three prisms rotate synchronously. The R, G, B color beams can keep scrolling on the image panel simultaneously. When the R, G, B color beams scroll one cycle, one frame of color image is formed.

In the conventional single-panel projection system, the scrolling speed for the color beams is not constant, and it is uneasy to synchronize the image modulation with scrolling color bands. The incident angle of color beams passed through the rotating prisms 108, 109, and 110 to the dichroic mirrors 105, 106, and 107 is not fixed, and it caused spectrum deviation of the color beams.

To overcome the foregoing shortcomings, the inventor of the present invention based on years of experience in the related field to conduct extensive researches and experiments invents a scrolling device with color separation and a projection system incorporating same to be an optimum solution.

SUMMARY OF THE INVENTION

Therefore, it is a primary objective of the present invention to provide a scrolling device with color separation and a projection system incorporating same.

In accordance with the primary objective of the present invention, the scrolling device with color separation is applied in separating an incident light beam and can be disposed in the projection system. The scrolling device with color separation comprises a scrolling shaft and a plurality of helical mirrors. The helical mirrors are made to form dichroic filters. The dichroic mirrors can reflect a certain spectrum of the white light, and transmit the others. The scrolling shaft can perform a motion based on a predetermined axis. The plurality of helical mirrors is spirally arranged around the outer surface of the scrolling shaft. The plurality of helical mirrors is driven by the scrolling shaft to separate the incident light beam into a plurality of color light beams that sequentially scrolls. More specifically, the plurality of helical mirrors can be spirally arranged and/or overlapped around the outer surface of the scrolling shaft.

It is a second object of the present invention to provide a scrolling device with color separation. The scrolling device also comprises a scrolling shaft and at least two helical mirrors, and both of the helical mirrors include a plurality of dichroic mirror threads. The helical mirrors can separate the incident light into color light beams red and cyan, or green and magenta, or blue and yellow. Those color light beams sequentially scroll. The cyan color beam is complementary color of red. The magenta color beam is complementary color of green. The yellow color beam is complementary color of blue. The motion performed by the scrolling shaft is rotating motion.

It is a third object of the present invention to provide a projection system. The projection system comprises a light source for emitting a light, a light integrator for collimating and uniforming the light to form an incident light beam, a scrolling device having a scrolling shaft and a plurality of helical mirrors, a light combination assembly for reflecting and combining with a plurality of color light beams from the plurality of helical mirrors, a relay lens for adjusting combined color beams, and an image panel for modulating combined color beams from the light combination assembly based on an image signal to form a color image. A plurality of field lenses is further provided between the scrolling device and the light combination assembly for adjusting light paths of the plurality of color light beams separated by the plurality of helical mirrors.

To make it easier for our examiner to understand the objective of the invention, its innovative features and performance, a detailed description and technical characteristics of the present invention are described together with the drawings as follows.

BRIEF DESCRIPTION OF THE DRAWINGS

FIG. 4b is a schematic diagram of the color bands impinged onto the image panel by the scrolling operation according to FIG. 4a;

DETAILED DESCRIPTION OF THE PREFERRED EMBODIMENTS

Referring to the related figures for the scrolling device with color separation and the projection system incorporating same according to a preferred embodiment of the present invention, wherein the same elements are described by the same reference numerals.

Figure 2A:
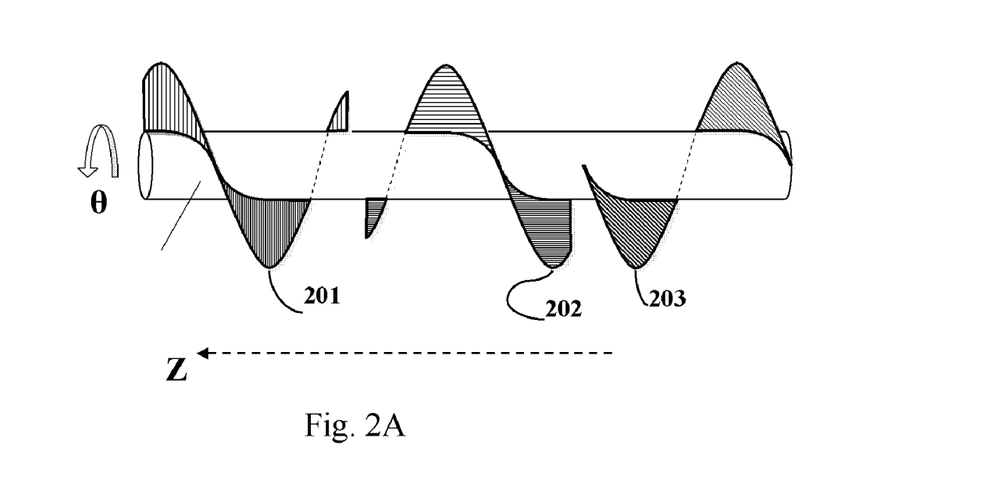
FIG. 2A is a schematic diagram of a scrolling device with color separation according to an embodiment of the present invention.

Referring to FIG. 2A, a schematic diagram illustrates a scrolling device with color separation according to an embodiment of the present invention. The scrolling device comprises a scrolling shaft 200 and a plurality of helical mirrors 201, 202, and 203. The scrolling device is for separating an incident light beam and is applied in a projection system. The scrolling shaft 200 can perform a motion based on a predetermined axis. The plurality of helical mirrors 201, 202, and 203 is spirally arranged around the outer surface of the scrolling shaft 200. The plurality of helical mirrors 201, 202, and 203 is driven by the scrolling shaft 200 to separate the incident light beam into a plurality of color light beams that sequentially scrolls. The motion performed by the scrolling shaft 200 is preferably rotating motion. The plurality of helical mirrors 201, 202, 203 is preferably dichroic-mirror threads.

The plurality of color light beams is red, green, and blue (RGB) color beams. The dichroic-mirror thread 201 reflects the red color beam and transmits the green and blue color beams. The dichroic-mirror thread 202 then reflects the green color beam and transmits the blue color beam. The dichroic-mirror thread 203 then reflects the blue color beam and can be replaced with a total reflection mirror. The $\theta$ is the angle around the scrolling shaft 200. The predetermined axis is Z as an axial coordinate along the scrolling shaft 200.

Figure 2B:
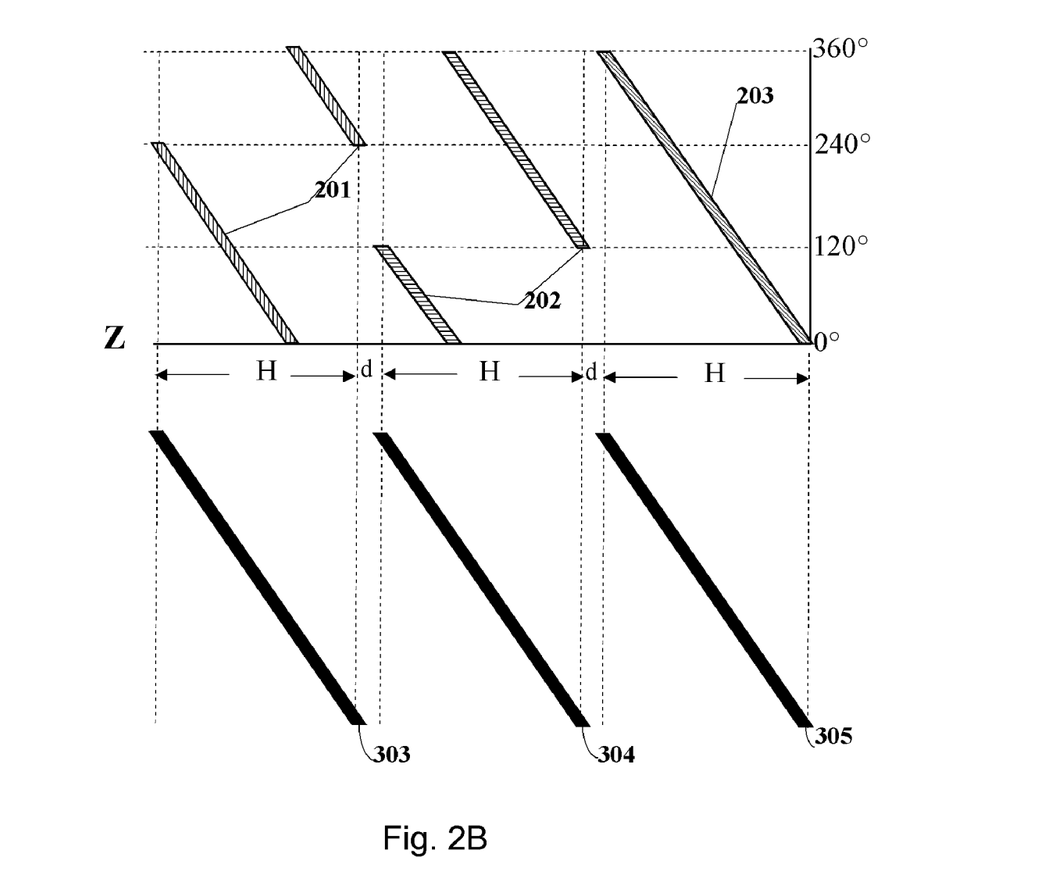
FIG. 2B is a schematic diagram of the geometric structures of dichroic-mirror threads disposed around the scrolling device with color separation according to an embodiment of the present invention.
Figure 2C:
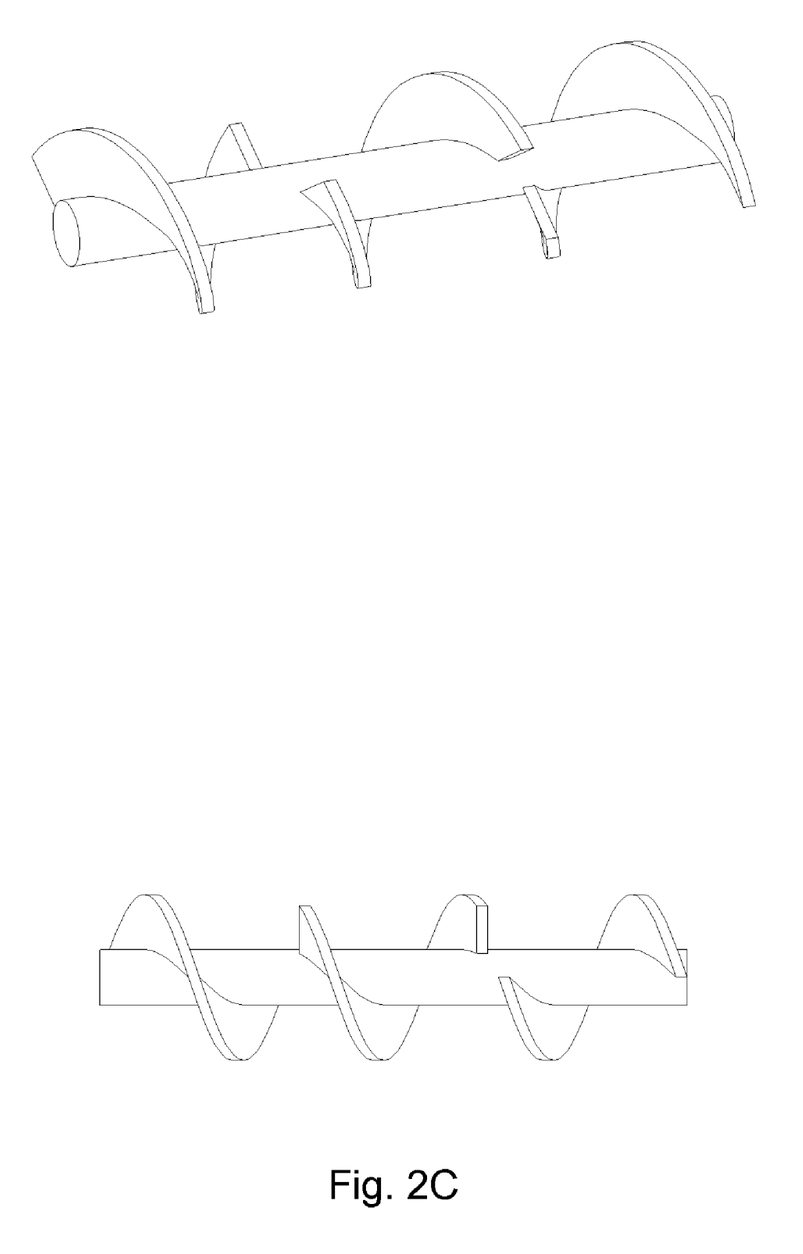
FIG. 2C is a pictorial drawing of a scrolling device with color separation according of the present invention.

The geometric structures of the dichroic-mirror threads 201, 202, and 203 are illustrated in FIG. 2B. The dichroic-mirror threads 201, 202, and 203 are arranged with the same lead angle. The dichroic-mirror thread 203 extends from the position "$\theta=0°$, $Z=0$" to "$\theta=360°$, $Z=H$", and surrounds the scrolling shaft 200 one turn. The span of the dichroic-mirror thread 203 is H. "d" is a spacing between dichroic-mirror threads 201, 202 and 203. Therefore, the dichroic-mirror thread 202 extends from the position "$\theta=120°$, $Z=d+H$" to "$\theta=120°$, $Z=d+2H$", and surrounds the scrolling shaft 200 one turn. The span of the dichroic-mirror thread 202 is H. The dichroic-mirror thread 201 extends from the position "$\theta240°$, $Z=2d+2H$" to "$\theta=240'$, $Z=2d+3H$", and surrounds the scrolling shaft 200 one turn. The span of the dichroic-mirror thread 201 is also H. The phase difference among the three dichroic-mirror threads is equal to the quotient of 360° divided by the number of dichroic-mirror threads, i.e. 120° in the embodiment. The related position of a light combination assembly is also illustrated in FIG. 2B. A reflector 303 of the light combination assembly is disposed in parallel to the dichroic-mirror thread 201, and extends from the "$Z=2d+2H$" to "$Z=2d+3H$". Both are the same as the dichroic-mirror thread 201. A dichroic mirror 304 of the light combination assembly is placed in parallel to the dichroic-mirror thread 202, and extends from the "$Z=d+H$" to "$Z=d+2H$", both are the same as the dichroic-mirror thread 202. A dichroic mirror 305 of the light combination assembly is placed in parallel to the dichroic-mirror thread 203, and extends from the "$Z=0$" to "$Z=H$". Both are the same as the dichroic-mirror thread 203. The pictorial drawings for the scrolling device with color separation from different visual angles are shown in FIG. 2C.

Figure 3:
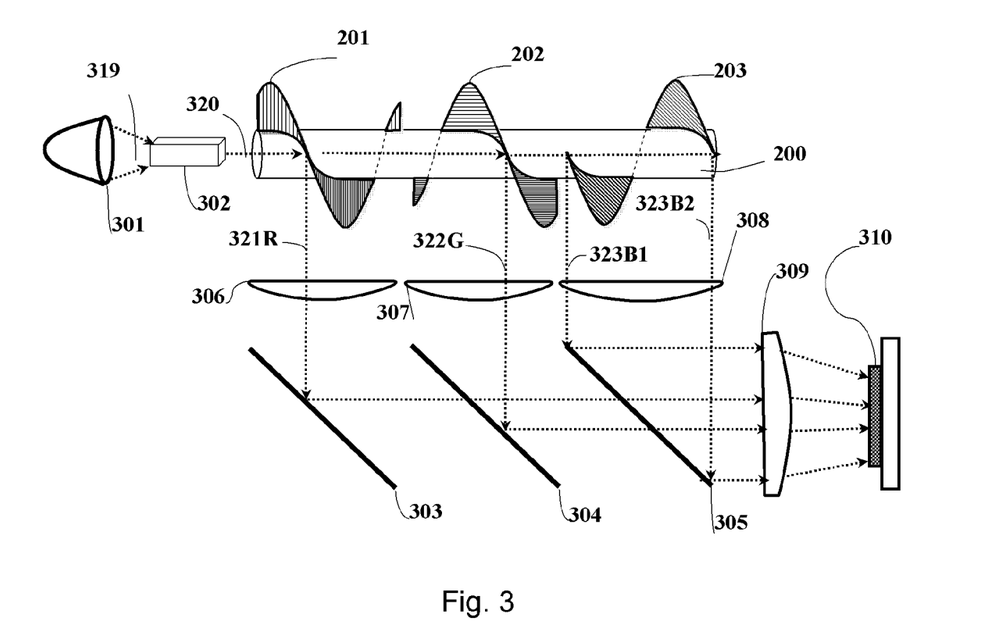
FIG. 3 is a schematic diagram of a scrolling device with color separation for use in a projection system according to a preferred embodiment of the present invention.

Referring to FIG. 3, a schematic diagram illustrates a scrolling device with color separation for use in a projection according to a preferred embodiment of the present invention. The projection system comprises a light source 301, a light integrator 302, the scrolling device 2 which has the scrolling shaft 200 and the plurality of helical mirrors 201, 202, and 203 (dichroic mirror threads), a plurality of field lens 306, 307, and 308, a light combination assembly which has the reflector 303 and the dichroic mirrors 304 and 305, a relay lens 309 and an image panel 310. The light source 301 is for emitting a light 319. The light integrator 302 is for collimating and uniforming the light 319 to form an incident light beam 320. The incident light beam 320 is then separated by the plurality of dichroic-mirror threads 201, 202, and 203 into the RGB color light beams, which means the incident light beam 320 is guided to the dichroic-mirror threads of the scrolling device with color separation in parallel to the predetermined axis of the scrolling shaft 200. The dichroic-mirror thread 201 reflects the red color beam 321R to the reflector 303 of the light combination assembly, and transmits the green and blue color beams to the dichroic-mirror thread 202. The dichroic-mirror thread 202 then reflects the green color beam 322G to the dichroic mirror 304 of the light combination assembly, and transmits the blue color beam to the dichroic-mirror thread 203. The blue color beam impinges on the top and the bottom of the dichroic-mirror thread 203; a portion of the blue color beam is reflected by the top of the dichroic-mirror thread 203 as the blue color beam 323B1, and a portion of the blue color beam is reflected by the bottom of the dichroic-mirror thread 203 as the blue color beam 323B2. The dichroic-mirror thread 203 then reflects the blue color beams 323B1 and 323B2 to the dichroic mirror 305 of light combination assembly, and can be replaced with a total reflection mirror. The plurality of field lens 306, 307, and 308 are disposed between the scrolling device and the light combination assembly to adjust the light paths of the color light beams. The light combination assembly includes the total reflective mirror 303 and two dichroic mirrors 304 and 305. The light combination assembly combines with the separated color beams 321R, 322G, 323B1 and 323B2, and transmits the combined color beams to the relay lens 309. The relay lens 309 is for adjusting the shape of combined color beams, and transmits the color beams onto the image panel 310. The reflected positions of the color beams are circularly moving from the bottom to the top of the dichroic-mirror threads as the rotating motion performed by the scrolling device with color separation. For example, since the dichroic-mirror threads are placed with 120° phase shift as shown in FIG. 2B, the circularly movements of reflected position of color beams 321R, 322G, and 323B (323B1 and 323B2) are with ⅓ phase difference of one cycle. The reflected position of the color beams 321R, 322G, and 323B (323B1 and 323B2) on the light combination assembly are also with ⅓ phase difference of the one cycle.

Figure 4A:
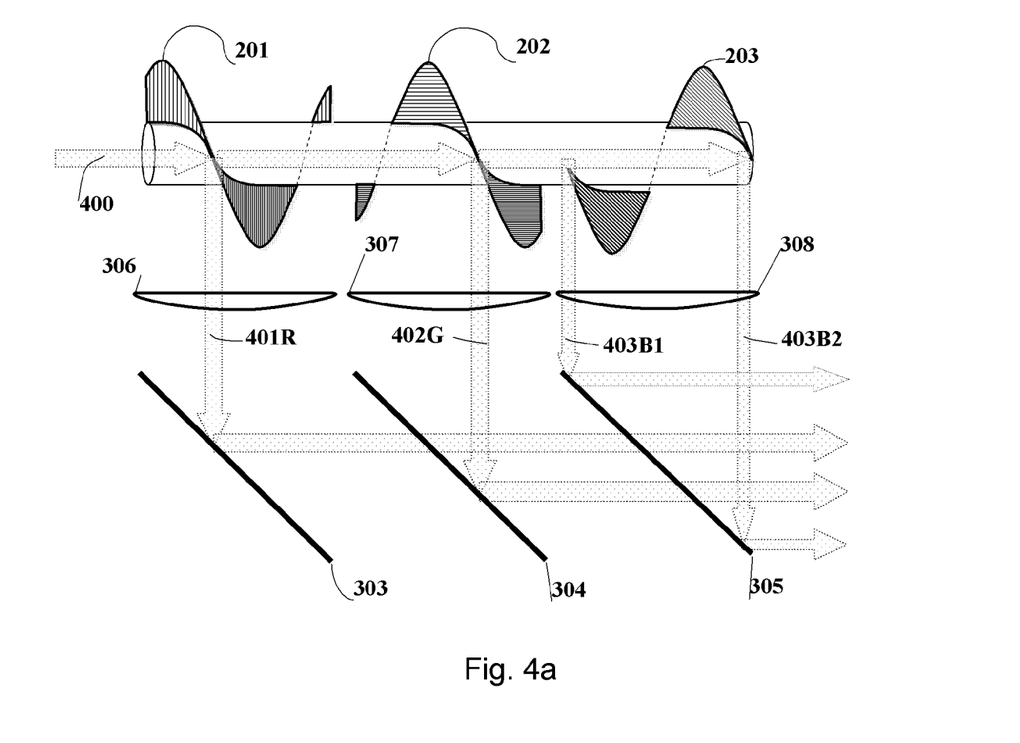
FIG. 4a is a schematic diagram of the color beams scrolling operation when the incident light beam impinges on the dichroic-mirror threads at 0° position according to the present invention.
Figure 4B:
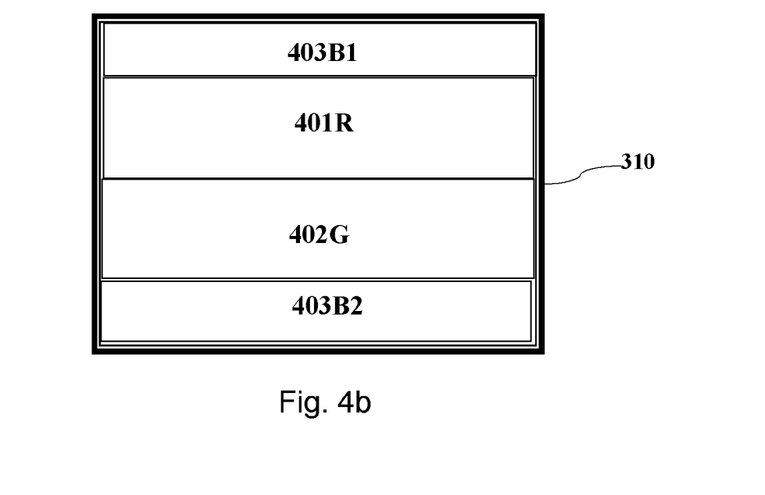

A relation between the scrolling of separated color beams and the rotating motion performed by the scrolling device with color separation are illustrated from FIG. 4a to FIG. 4f. In FIG. 4a, when the scrolling device rotates from angle 0°, i.e. a light beam 400 emitted from a light source is incident to the dichroic-mirror threads on the angle 0° as shown in FIG. 2B. The incident light is separated by the dichroic-mirror threads 201, 202 and 203 of the scrolling device into color beams 401R, 402G, 403B1 and 403B2. The blue color beam impinges on both the top and the bottom of the dichroic-mirror thread 203; the portion of the blue color beam is reflected by the top of the dichroic-mirror thread 203 as the blue beam 403B1, and the portion of the blue color beam is reflected by the bottom of the dichroic-mirror thread 203 as the beam 403B2. The reflected position of the RGB color beams 401R, 402Q and 403B (403B1 and 403B2) on the dichroic-mirrors threads are with ⅓ phase difference of one cycle. The reflected position of the color beams 401R, 402G, and 403B (403B1 and 403B2) on the light combination assembly are also with ⅓ phase difference of the one cycle. Therefore, the corresponding formation for combined color beams on the image panel 310 is shown in FIG. 4b. The color beam 403B1 is at the top of the image panel. The color beams 401R and 402G are at the middle of the image panel. The color beam 403B2 is at the bottom of the image panel.

Figure 4C:
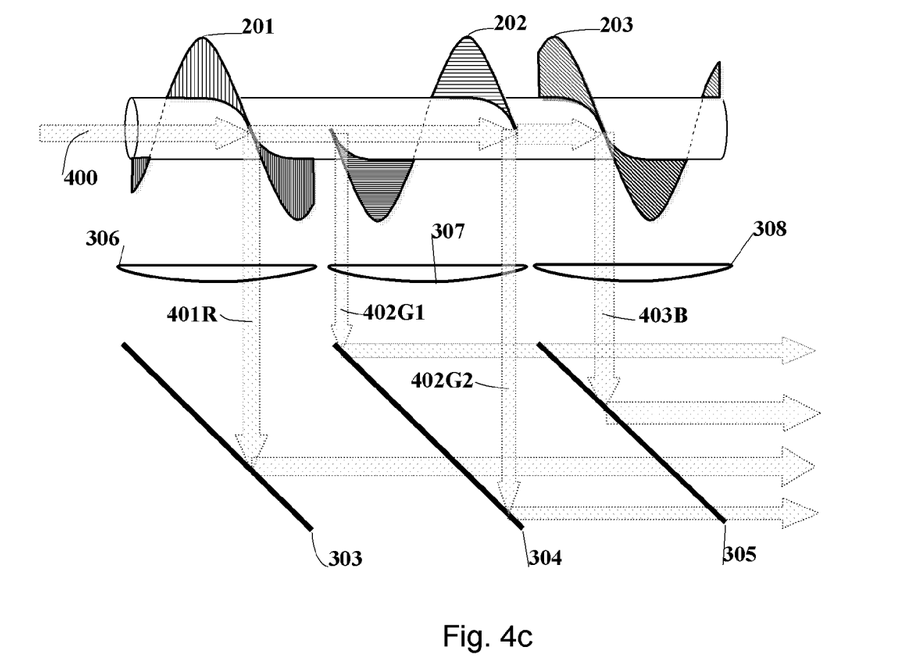
FIG. 4c is a schematic diagram of the color beams scrolling operation when the incident light beam impinges on the dichroic-mirror threads at 120° position according to the present invention.
Figure 4D:
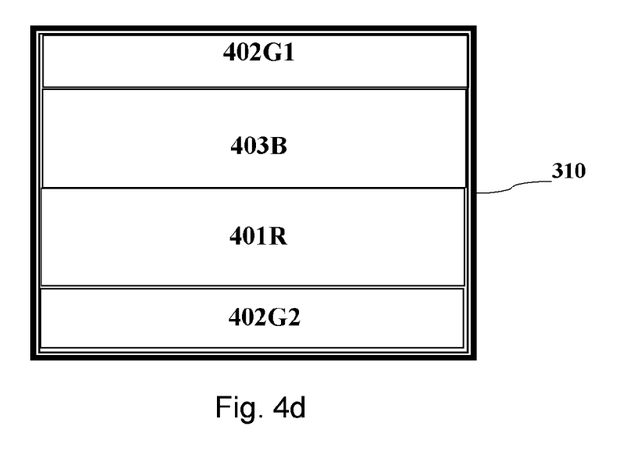
FIG. 4d is a schematic diagram of the color bands impinged onto the image panel by the scrolling operation according to FIG. 4c

In FIG. 4c, when the scrolling device rotates to angle 120°, i.e. the light beam 400 emitted from the light source is incident to the dichroic-mirror threads on the angle 120° as shown in FIG. 2B. The incident light is separated into color beams 401R, 402G1, 402G2 and 403B through the dichroic-mirror threads 201, 202 and 203 of the scrolling device with color separation. The green color beam impinges on both the top and bottom of the dichroic-mirror thread 202; a portion of the green color beam is reflected by the top of the dichroic-mirror thread 202 as the green beam 402G1, and a portion of the green color beam is reflected by the bottom of the dichroic-mirror thread 202 as the green beam 402G2. The reflected position of color beams 401R, 402G (402G1 and 402G2), and 403B on the dichroic-mirrors threads are with ⅓ phase difference of one cycle. The reflected position of the color beams 401R, 402G (402G1 and 402G2), and 403B on the light combination assembly are also with ⅓ phase difference of the one cycle. Therefore, the corresponding formation for combined color beams on the image panel 310 is shown in FIG. 4d. The color beam 402G1 is at the top of the image panel. The color beams 403B and 401R are at the middle of the image panel. The color beam 402G2 is at the bottom of the image panel.

Figure 4E:
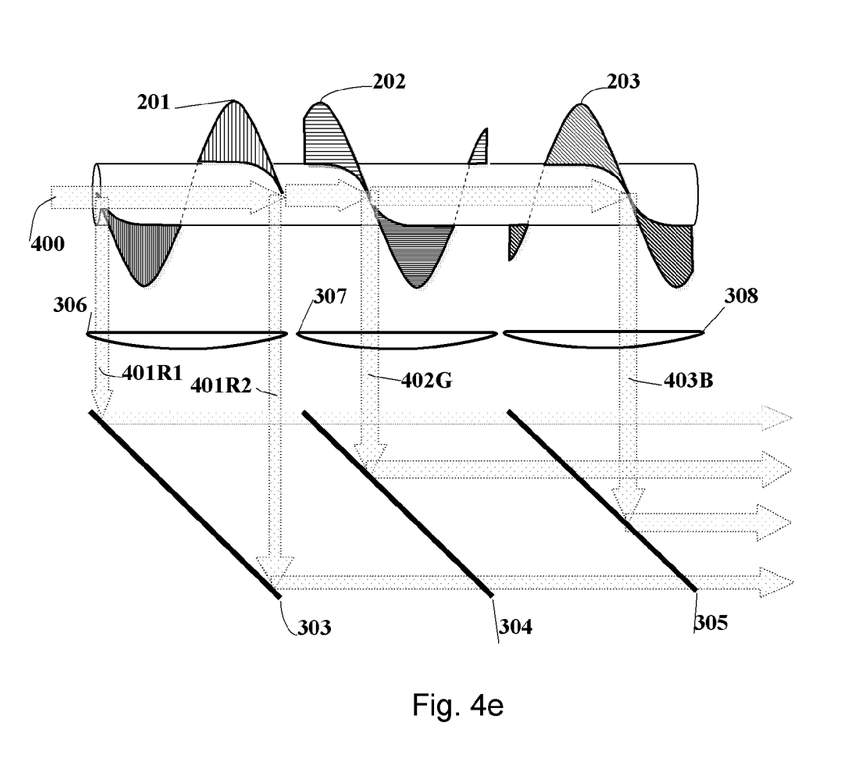
FIG. 4e is a schematic diagram of the color beams scrolling operation when the incident light beam impinges on the dichroic-mirror threads at 240° position according to the present invention.
Figure 4F:
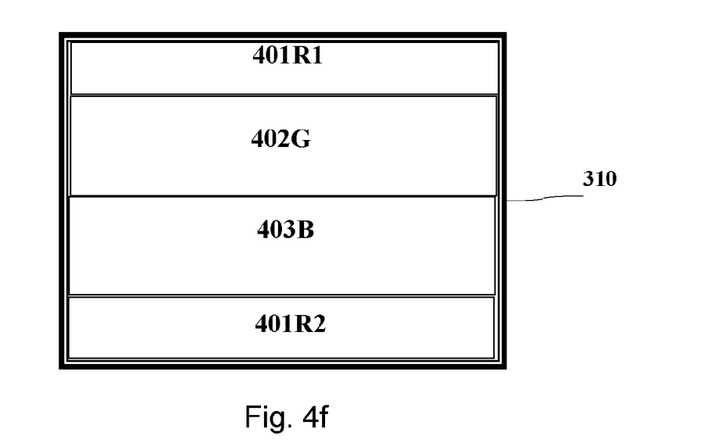
FIG. 4f is a schematic diagram of the color bands impinged onto the image panel by the scrolling operation according to FIG. 4e.
Figure 5:
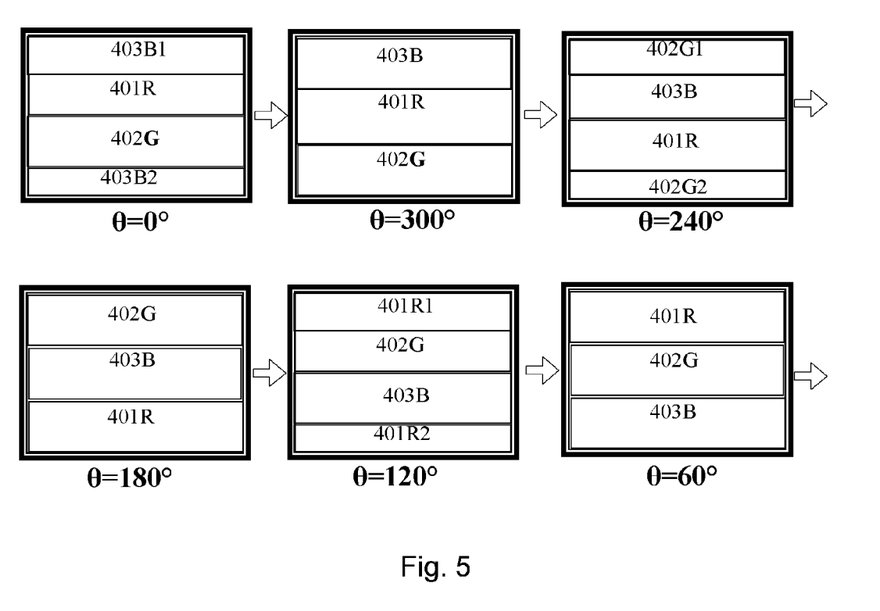
FIG. 5 is a schematic diagram of the movement of color bands impinged onto the image panel in one rotation of the scrolling device with color separation according to the present invention.

In FIG. 4e, when the scrolling device with color separation rotates to angle 240°, i.e. the light beam 400 emitted from the light source is incident to the dichroic-mirror threads on the angle 120° as shown in FIG. 2B. The incident light is separated into color beams 401R1, 401R2, 402G and 403B through the dichroic-mirror threads 201, 202 and 203 of the scrolling device. The red color beam impinges on both the top and the bottom of the dichroic-mirror thread 201; a portion of the green color beam is reflected by the top of the dichroic-mirror thread 201 as the red beam 401R1, and a portion of the blue color beam is reflected by the bottom of the dichroic-mirror thread 201 as the red beam 401R2. The reflected position of color beams 401R (401R1 and 401R2), 402Q and 403B on the dichroic-mirrors threads are with ⅓ phase difference of one cycle. The reflected position of the color beams 401R (401R1 and 401R2), 402Q and 403B on the light combination assembly are also with ⅓ phase difference of the one cycle. Therefore, the corresponding formation of combined color beams on the image panel 310 is shown in FIG. 4f. The color beam 401R1 is at the top of the image panel. The color beams 402G and 403B are at the middle of the image panel. The color beam 401R2 is at the bottom of the image panel FIG. 5 shows the scrolling effect of the color beams on the image panel. The scrolling device rotates from 360° via 300°, 240°, 180°, 120°, 60° to 0°, and forms one cycle. The positions of color bands 401R, 402G and 403B also scroll around the image panel for the one cycle. Therefore, a single-panel projection system with color scrolling function is achieved.

Figure 10:
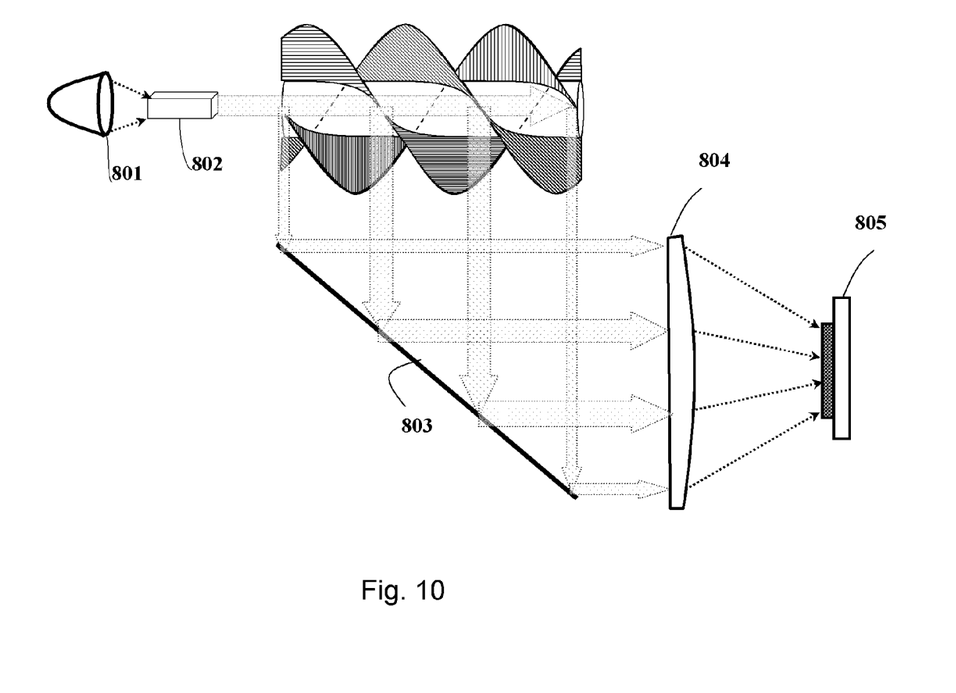
FIG. 10 is a schematic diagram of a scrolling device with overlapped helical mirrors according to a further embodiment of the present invention.

Moreover, the plurality of helical dichroic mirrors can be spirally overlapped around the outer surface of the scrolling device as shown in FIG. 10. The dichroic-mirror threads can be placed with 120° phase shift. The volume of the scrolling device can be reduced. A light source 801 emits a light and a light integrator 802 collimates and uniforms the light to form an incident light beam. The incident light beam is then separated by the two overlapped dichroic-mirror threads into RGB color beams. A total reflection mirror 803 is used for reflecting the RGB color light beams to a relay lens 804. The relay lens 804 adjusts these color beams, and transmits these color beams onto an image panel 805 with an image signal so as to form a color image.

Figure 6A:
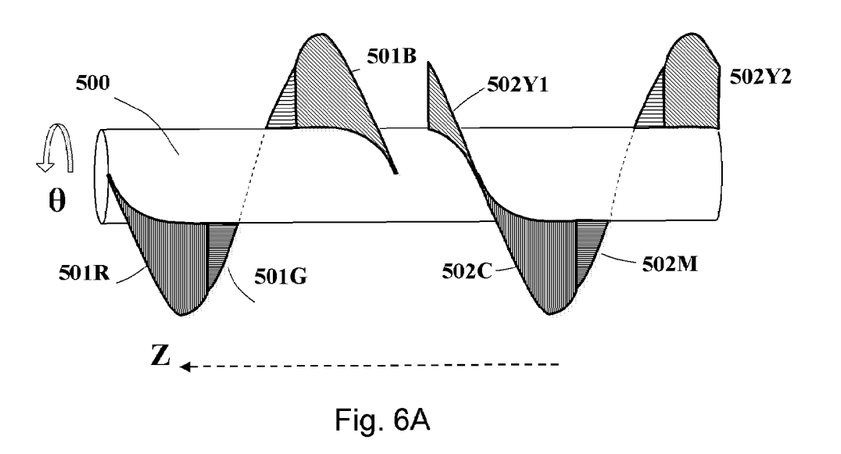
FIG. 6A is a schematic diagram of a scrolling device according to another embodiment of the present invention.

Furthermore, the scrolling device can only utilize two helical mirrors (dichroic-mirror threads) to separate the incident light into RGB color beams. Referring to FIG. 6A, a schematic diagram illustrates a scrolling device according to another embodiment of the present invention. The scrolling device has a scrolling shaft 500, a first helical mirror 501 and a second helical mirror 502. The first helical mirror 501 and the second helical mirror 502 are spirally arranged around the outer surface of the scrolling shaft. The first helical mirror and the second helical mirror separate the incident light beam into a plurality of color light beams. The scrolling shaft 500 also performs a motion based on a predetermined axis to drive the first helical mirror 501 and the second helical mirror 502 to sequentially scroll the plurality of color light beams. The first helical mirror 501 is divided into three portions 501R, 501G, and 501B for reflecting RGB color beams, and transmits yellow, cyan, and magenta (CMY) color beams. The second helical mirror 502 is divided into three portions 502Y (501Y1 and 502Y2), 502C, and 502M for CMY color beams. The motion performed by the scrolling shaft 500 is rotating motion. The $\theta$ is the angle around the scrolling shaft 500. The predetermined axis is Z as an axial coordinate along the scrolling shaft 500.

Figure 6B:
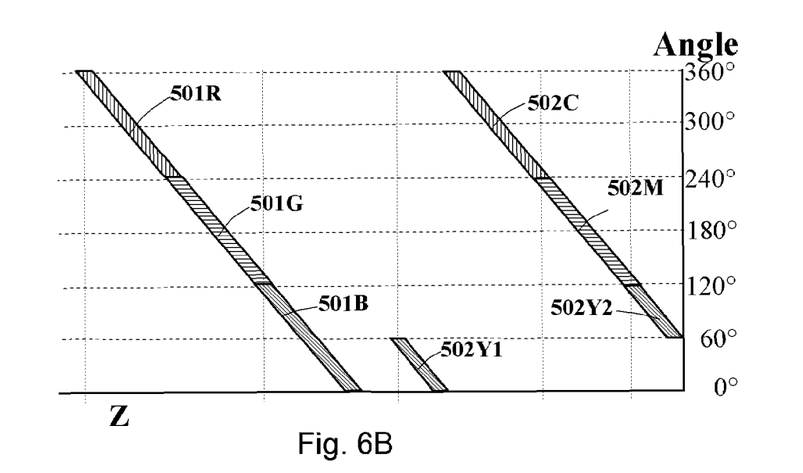
FIG. 6B is a schematic diagram of the geometric structures of the dichroic-mirror threads according to another embodiment of the present invention.

The geometric structures of the dichroic-mirror threads 501 and 502 are illustrated in FIG. 6B. The dichroic-mirror threads are arranged with the same lead angle. For example, the second dichroic-mirror thread extends from the position "$\theta=60°$" to "$\theta=60°$", and surrounds the scrolling shaft 500 one turn. The first dichroic-mirror thread extends from the position "$\theta=0°$" to "$\theta=360°$", and surrounds the scrolling shaft 500 one turn. Moreover, the portion 501R extends from the position "$\theta=240°$" to "$\theta=360°$". The portion 501G extends from the position "$\theta=120°$" to "$\theta=240°$". The portion 501B extends from the position "$\theta=0°$" to "$\theta=120°$". The portion 502C extends from the position "$\theta=240°$" to "$\theta=360°$". The portion 502M extends from the position "$\theta=120°$" to "$\theta=240°$". The portion 502Y1 extends from the position "$\theta=0°$" to "$\theta=60°$". The portion 502Y2 extends from the position "$\theta=60°$" to "$\theta=120'$". The phase difference between the two dichroic-mirror threads is equal to the quotient of 360° based on a certain degrees, i.e. 60° set in the embodiment.

Figure 7:
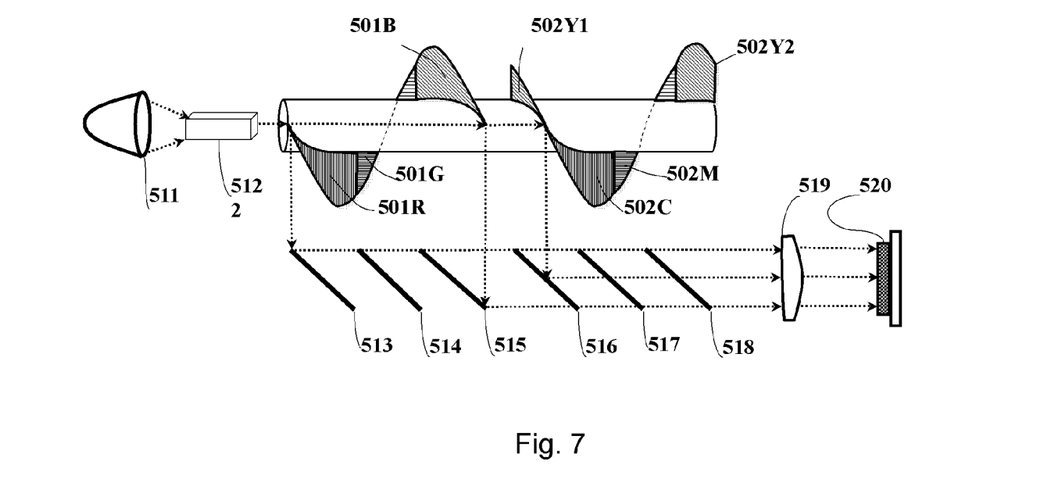
FIG. 7 is a schematic diagram of a projection system according to another embodiment of the present invention.

Referring to FIG. 7, a schematic diagram illustrates a projection system according to another embodiment of the present invention. The projection system comprises a light source 511, a light integrator 512, the scrolling device which has the scrolling shaft 500, the first helical mirror 501 and the second helical mirrors 502 (dichroic mirror threads), a light combination assembly 513 to 518, a relay lens 519 and an image panel 520. The light source 511 is for emitting a light. The light integrator 512 is for collimating and uniforming the light to form an incident light beam. The incident light beam is then separated by the first and the second dichroic-mirror threads 501 and 502 into the RGB and CMY color beams, which means the incident light beam is guided to the first and the second dichroic-mirror threads 501 and 502 of the scrolling device with color separation in parallel to the predetermined axis of the scrolling shaft 500. It should be noted that the cyan color beam is complementary color of red, the magenta color beam is complementary color of green, and the yellow color beam is complementary color of blue. The relay lens 519 is for adjusting the shape of combined color beams that are then transmitted to onto the image panel 520.

Figure 8:
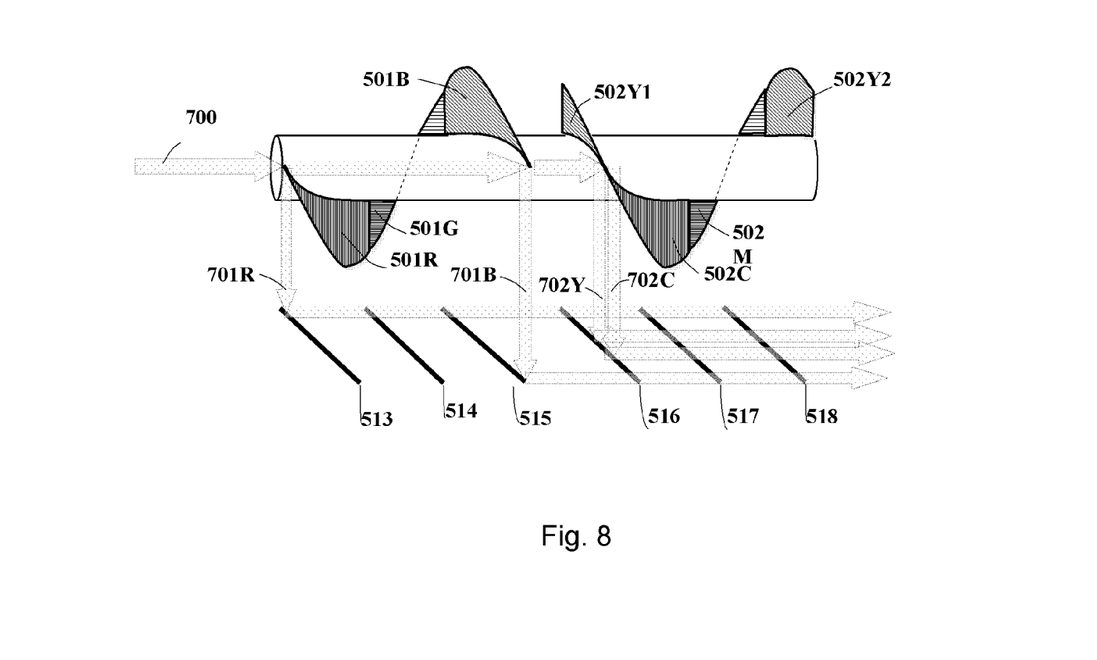
FIG. 8 is a schematic diagram of a relation between the scrolling of separated color beams and the rotating motion performed by the scrolling device with color separation according to another embodiment of the present invention.

Referring to FIG. 8, a schematic diagram illustrates a relation between the scrolling of separated color beams and the rotating motion performed by the scrolling device with color separation according to an embodiment of the present invention. The scrolling device rotates to angle 0°, i.e., a light beam 700 emitted from the light source is incident to the dichroic-mirror threads on the angle 0°. The incident light is separated by the first helical mirror 501 and the second helical mirror 502 into color beams 701R, 701B, 702Y, and 702C. The corresponding formation for combined color beams on the image panel 520 is then shown in FIG. 9. The color beam 701R is at the top of the image panel. The color beams 702Y and 702C are at the middle of the image panel.

Figure 9:
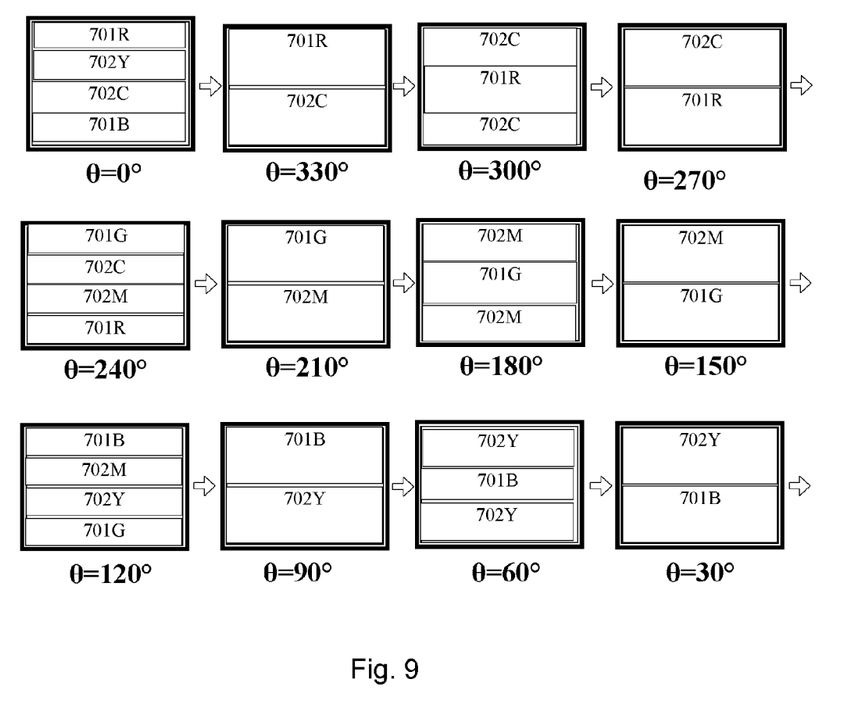
FIG. 9 is a schematic diagram of the movement of color bands impinge onto the image panel in one rotation of the scrolling device with color separation according to another embodiment of the present invention.

The color beam 701B is at the bottom of the image pane. FIG. 9 also shows the scrolling effect of the color beams on the image panel. The scrolling device rotates from 360° via 330°, 300°, 270°, 240°, 210°, 180°, 150°, 120°, 90°, 60°, 30° to 0°, and forms one cycle. The position of color bands 701R, 701G, 701B, 702C, 702M, and 702Y also scroll around the image panel for the one cycle.

While the invention has been described by ways of examples and in terms of the preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scrolling device with color separation, applicable for separating an incident light beam, comprising:
    a scrolling shaft for performing a motion based on a predetermined axis; and
    a plurality of helical mirrors spirally arranged around the outer surface of said scrolling shaft,
    wherein said plurality of helical mirrors is driven by said scrolling shaft to separate said incident light beam into a plurality of color light beams that sequentially scrolls.

2. The scrolling device with color separation of claim 1, wherein said incident light beam is collimated and uniformed by a light integrator.

3. The scrolling device with color separation of claim 2, wherein a light source is disposed in front of said light integrator for producing a light to be guided into said light integrator.

4. The scrolling device with color separation of claim 1, wherein said plurality of helical mirrors is a plurality of dichroic mirror threads.

5. The scrolling device with color separation of claim 1, wherein at least one field lens is disposed under said scrolling device for adjusting light paths of said plurality of color light beams separated by said plurality of helical mirrors.

6. The scrolling device with color separation of claim 1, wherein a light combination assembly is disposed under said field lens and in parallel to said plurality of helical mirrors for reflecting and combining with said plurality of color light beams adjusted by said field lens, and said light combination assembly further includes a reflector and at least one dichroic mirror.

7. The scrolling device with color separation of claim 6, wherein said reflector is a reflective mirror.

8. The scrolling device with color separation of claim 1, wherein a relay lens is disposed behind said light combination assembly for adjusting combined color beams.

9. The scrolling device with color separation of claim 1, wherein an image panel is disposed behind said relay lens for modulating combined color beams.

10. The scrolling device with color separation of claim 1, wherein said plurality of color light beams is red, green and blue (RGB) color light beams.

11. The scrolling device with color separation of claim 4, wherein said plurality of dichroic mirror threads is placed between 40° phase shift and 150° phase shift.

12. The scrolling device with color separation of claim 1, wherein said motion performed by said scrolling shaft is rotating motion.

13. A scrolling device with color separation, applicable for separating an incident light beam, comprising:
   a scrolling shaft having a plurality of helical mirrors spirally overlapped around the outer surface of said scrolling shaft;
   wherein said plurality of helical mirrors separate said incident light beam into a plurality of color light beams;
   wherein said scrolling shaft performs a motion based on a predetermined axis to drive said plurality of helical mirrors so as to sequentially scroll said plurality of color light beams.

14. The scrolling device with color separation of claim 13, wherein a reflector is disposed in parallel to said scrolling device for reflecting said plurality of color light beams.

15. The scrolling device with color separation of claim 13, wherein a relay lens is disposed behind said reflector for adjusting reflected color beams.

16. The scrolling device with color separation of claim 13, wherein an image panel is disposed behind said relay lens for receiving said reflected color beams.

17. A projection system comprising:
   a light source provided a light;
   a light integrator for collimating and uniforming said light to form an incident light beam;
   a scrolling device, comprising:
   a scrolling shaft having a plurality of helical mirrors spirally arranged and/or overlapped around the outer surface of said scroll shaft;
   wherein said plurality of helical mirrors are driven by said scrolling shaft to separate said incident light beam into a plurality of color light beams that scrolls around a predetermined axis;
   a light combination assembly for reflecting and combining with said plurality of color light beams from said plurality of helical mirrors;
   a relay lens for adjusting combined color beams; and
   an image panel for modulating combined color beams from said light combination assembly with an image signal to form a color image.

18. The projection system of claim 17, wherein a field lens is further disposed between said scrolling device and said light combination assembly for adjusting light path of said plurality of color light beams.

19. The projection system of claim 17, wherein said plurality of color light beams is RGB color beams.

20. The projection system of claim 17, wherein said plurality of color light beams further comprises cyan, magenta, yellow color beams, and said cyan color beam is complementary color of red, and said magenta color beam is complementary color of green, and said yellow color beam is complementary color of blue.

* * * * *